(12) United States Patent
Xia et al.

(10) Patent No.: US 10,207,939 B2
(45) Date of Patent: Feb. 19, 2019

(54) ELECTROCHEMICAL WATER TREATMENT SYSTEM AND METHOD

(71) Applicant: GENERAL ELECTRIC COMPANY, Schenectady, NY (US)

(72) Inventors: Zijun Xia, Shanghai (CN); Qunjian Huang, Shanghai (CN); Chihyu Caroline Sui, Trevose, PA (US); Jianhua Fang, Shanghai (CN); Xiaoan Xie, Shanghai (CN)

(73) Assignee: BL TECHNOLOGIES, INC., Minnetonka, MN (US)

( * ) Notice: Subject to any disclaimer, the term of this patent is extended or adjusted under 35 U.S.C. 154(b) by 897 days.

(21) Appl. No.: 14/652,833

(22) PCT Filed: Dec. 9, 2013

(86) PCT No.: PCT/US2013/073797
§ 371 (c)(1),
(2) Date: Jun. 17, 2015

(87) PCT Pub. No.: WO2014/099434
PCT Pub. Date: Jun. 26, 2014

(65) Prior Publication Data
US 2015/0344333 A1   Dec. 3, 2015

(30) Foreign Application Priority Data

Dec. 20, 2012  (CN) .......................... 2012 1 0559996

(51) Int. Cl.
*C02F 1/46* (2006.01)
*C02F 1/461* (2006.01)
*C02F 1/467* (2006.01)
*C25B 11/04* (2006.01)

(52) U.S. Cl.
CPC ........ *C02F 1/46109* (2013.01); *C02F 1/4674* (2013.01); *C25B 11/0447* (2013.01); *C02F 2201/46105* (2013.01); *C02F 2303/04* (2013.01)

(58) Field of Classification Search
CPC ............... C25B 11/0447; C02F 1/4674; C02F 1/46109; C02F 2201/46105; C02F 2303/04; C02F 1/467; C02F 1/461
See application file for complete search history.

(56) References Cited

U.S. PATENT DOCUMENTS 4,722,773 A * 2/1988 Plowman .................. C25B 1/46
204/252
5,356,663 A * 10/1994 Perusich .................. C08J 3/091
210/500.27
(Continued)

FOREIGN PATENT DOCUMENTS

| EP | 2172581 A1 * | 4/2010 | ............... C25B 1/24 |
|----|----|----|----|
| EP | 2172581 A1 | 4/2010 | |
| WO | 2008035092 A1 | 3/2008 | |

OTHER PUBLICATIONS

Xu et al., "Synthesis of novel sulfonated polybenzimidazole and preparation of cross-linked membranes for fuel cell application", Polymer, vol. No. 48, Issue No. 19, pp. 5556-5564, 2007.
(Continued)

*Primary Examiner* — Walter D. Griffin
*Assistant Examiner* — Cameron J Allen
(74) *Attorney, Agent, or Firm* — Wegman, Hessler & Vandenburg (57) ABSTRACT

A water treatment system comprises an electrolytic cell comprising: a first electrode; a second electrode comprising a coating of polymer comprising structural units of formula I and a power source for powering the first and the second electrodes; wherein $R^1$ is independently at each occurrence
(Continued)

a $C_1$-$C_6$ alkyl radical or —$SO_3H$; $R^2$ is independently at each occurrence a $C_1$-$C_6$ alkyl radical; a is independently at each occurrence an integer ranging from 0 to 4; and b is independently at each occurrence an integer ranging from 0 to 3. An associated method is also described.

20 Claims, 2 Drawing Sheets (56) References Cited

U.S. PATENT DOCUMENTS

| 5,525,436 | A | * | 6/1996 | Savinell | B01D 67/0088 |
|---|---|---|---|---|---|
| | | | | | 204/252 |
| 7,682,722 | B2 | | 3/2010 | Melzner et al. | |
| 7,682,723 | B2 | | 3/2010 | Melzner et al. | |
| 8,039,166 | B2 | | 10/2011 | Fujibayashi | |
| 2007/0154778 | A1 | | 7/2007 | Haufe et al. | |
| 2009/0098437 | A1 | | 4/2009 | Choi et al. | |

OTHER PUBLICATIONS

International Search Report and Written Opinion issued in connection with corresponding PCT Application No. PCT/US2013/073797 dated Feb. 28, 2014.

Unofficial English Translation of Chinese Office Action issued in connection with corresponding CN Application No. 201210559996.0 dated Jan. 30, 2015.

European Office Action issued in connection with corresponding EP Application No. 13812370.8-1371 dated May 25, 2016.

Xu et al., "Synthesis of Novel Polybenzimidazoles with Pendant Amino Groups and the Formation of Their Crosslinked Membranes for Medium Temperature Fuel Cell Applications", Journal of Polymer Science Part A: Polymer Chemistry, vol. 47, Issue 24, pp. 6992-7002, Dec. 15, 2009.

Mazur et al., "Preparation of Gas Diffusion Electrodes for High Temperature PEM-type Fuel Cells", Desalination and Water Treatment, vol. 14, Issue 1-3, pp. 101-105, Feb. 2010.

Wang et al., "Novel Epoxy-based Cross-Linked Polybenzimidazole for High Temperature Proton Exchange Membrane Fuel Cells", International Journal of Hydrogen Energy, vol. 36, Issue 14, pp. 8412-8421, Jul. 2011.

Mazur et al., "Gas Diffusion Electrodes for High Temperature PEM-type Fuel Cells: Role of a Polymer Binder and Method of the Catalyst Layer Deposition", Journal of Applied Electrochemistry, vol. 41, Issue 9, pp. 1013-1019 (7), Sep. 2011.

Lin et al., "Poly(Benzimidazole)-Epoxide Crosslink Membranes for High Temperature Proton Exchange Membrane Fuel Cells", International Journal of Hydrogen Energy, vol. 27, Issue 1, pp. 383-392, Jan. 2012.

* cited by examiner

ELECTROCHEMICAL WATER TREATMENT SYSTEM AND METHOD

BACKGROUND

This invention relates generally to water treatment systems and methods.

An article titled as "synthesis of novel sulfonated polybenzimidazole and preparation of cross-linked membranes for fuel cell application", POLYMER Volume 48, Issue 19, 10 Sep. 2007, pages 5556-5564, discloses sulfonated poly[2,20-(p-oxydiphenylene)-5,50-bibenzimidazole] (SOPBI), prepared by post-sulfonation reaction of the parent polymer, poly[2,20-(p-oxydiphenylene)-5,50-bibenzimidazole] (OPBI), may be used in membranes for fuel cells. Fuel cells are devices that convert chemical energies from fuels into electricity through chemical reactions and membranes are individual components separate from electrodes of the fuel cells.

Differently, electrolytic cells are electrochemical cells in which energies from applied voltages are used to drive otherwise nonspontaneous reactions and, as is disclosed in the international patent application publication No. WO 2008/035092 A1, are sometimes used in water treatment systems and methods, for example, to produce hypochlorite, such as sodium hypochlorite and potassium hypochlorite, for controlling levels of microorganisms in water circulation systems. Currently available water treatment systems and methods are unsatisfactory in the productivity of hypochlorite and the energy consumption of the electrolytic cell. Therefore, there is a need for new and/or improved water treatment systems and methods.

BRIEF DESCRIPTION

In one aspect, a water treatment system comprises an electrolytic cell comprising: a first electrode; a second electrode comprising a coating of a polymer comprising structural units of formula I and a power source for powering the first and the second electrodes; wherein $R^1$ is independently at each occurrence a $C_1$-$C_6$ alkyl radical or —$SO_3H$; $R^2$ is independently at each occurrence a $C_1$-$C_6$ alkyl radical; a is independently at each occurrence an integer ranging from 0 to 4; and b is independently at each occurrence an integer ranging from 0 to 3.

In another aspect, a method is provided and comprises: passing an electric current through an aqueous solution of an electrolyte; oxidizing at least a portion of anions of the aqueous solution to produce oxidation products; reducing at least some oxygen gas to produce hydroxide ions; transporting the hydroxide ions into proximity with the oxidation products through a coating of polymer of formula I to react with the oxidation products and cations of the aqueous solution to produce hypochlorite; and providing hypochlorite to water to control levels of microorganisms.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION OF THE DISCLOSURE

Approximating language, as used herein throughout the specification and claims, may be applied to modify any quantitative representation that could permissibly vary, without resulting in a change in the basic function to which it is related. Accordingly, a value modified by a term or terms, such as "about", is not limited to the precise value specified. In some instances, the approximating language may correspond to the precision of an instrument for measuring the value.

In the following specification and claims, the singular forms "a", "an" and "the" include plural referents, unless the context clearly dictates otherwise. Moreover, the suffix "(s)" as used herein is usually intended to include both the singular and the plural of the term that it modifies, thereby including one or more of that term. The terms "first," "second," and the like, herein do not denote any order, quantity, or importance, but rather are used to distinguish one element from another or one embodiment from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable. For example, in some circumstances, an event or capacity may be expected, while in other circumstances, the event or capacity cannot occur. This distinction is captured by the terms "may" and "may be".

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 600 to 1000, it is intended that values such as 600 to 850, 651 to 902, 700 to 851, 800 to 1000 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Reference throughout the specification to "one embodiment," "another embodiment," "an embodiment," "some embodiments," and so forth, means that a particular element (e.g., feature, structure, and/or characteristic) described in connection with the invention is included in at least one embodiment described herein, and may or may not be present in other embodiments. In addition, it is to be understood that the described inventive features may be combined in any suitable manner in the various embodiments and configurations.

Preferred embodiments of the present disclosure will be described hereinbelow with reference to the accompanying drawings. In the following description, well-known functions or constructions are not described in detail to avoid obscuring the disclosure in unnecessary detail.

Figure 1:
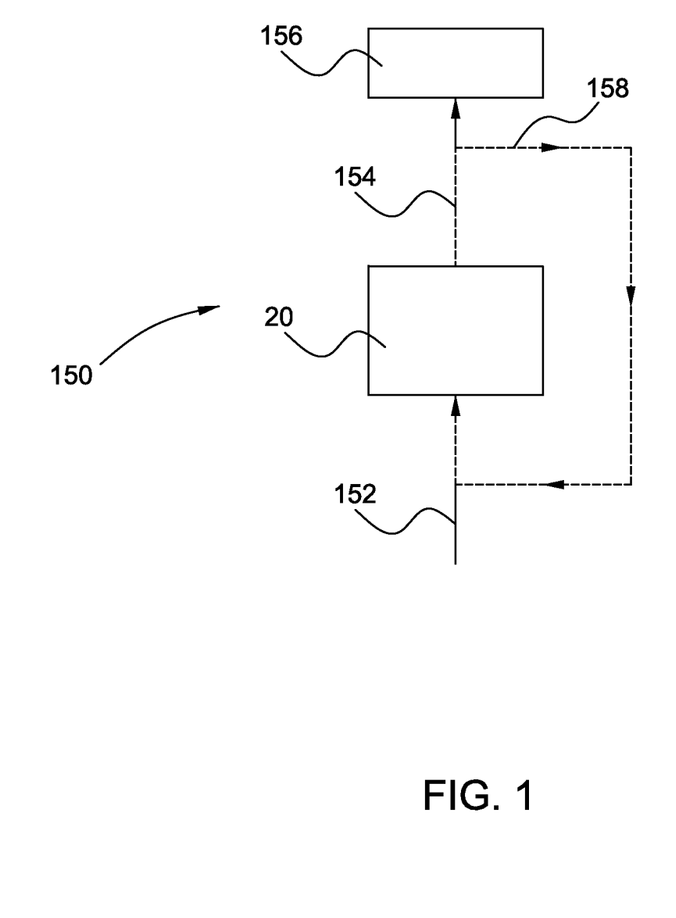
FIG. 1 is a schematic drawing of a water treatment system in accordance with one embodiment of the present invention.

According to embodiments of the present invention, the water treatment system could be any water treatment system that controls levels of microorganisms in water. FIG. 1 illustrates a water treatment system 150 in accordance with one embodiment of the present invention. The water treatment system 150 comprises an electrolytic cell 20, an input line 152, an output line 154 and a downstream unit 156.

Figure 2:
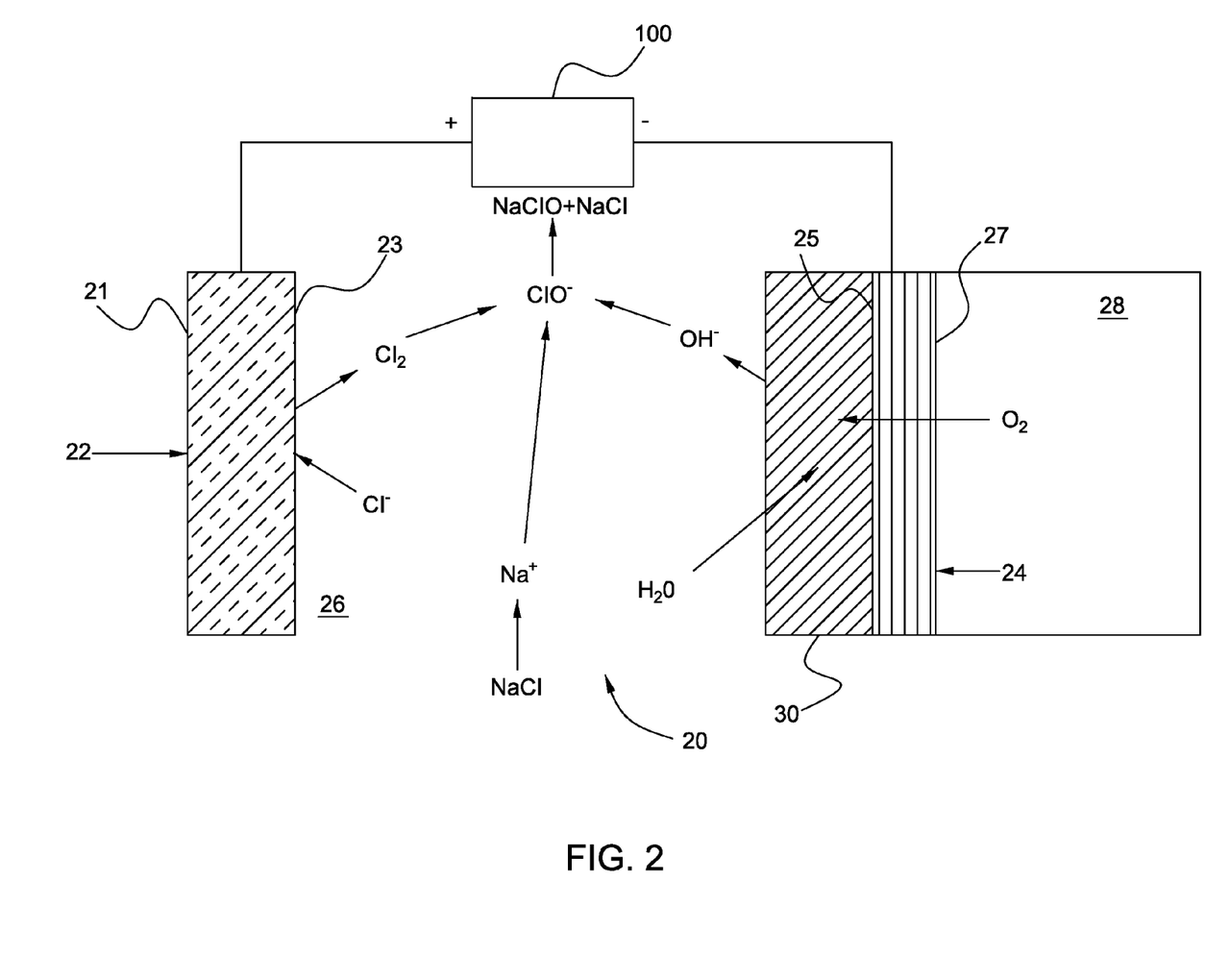
FIG. 2 is a schematic cross-sectional view of the electrolytic cell used in the water treatment system of FIG. 1.

Please also refer to FIG. 2, the electrolytic cell 20 comprises a first electrode 22, a second electrode 24 and a power source 100. In the illustrated embodiment, the electrolytic cell 20 comprises a liquid chamber 26, and a gas chamber 28.

The power source 100 may be a source of DC or AC electric current that flows through an electrolytic circuit. The liquid chamber 26 is positioned between the first electrode 22 and the second electrode 24 and is adapted to receive an aqueous solution of an electrolyte that contains anions and cations from the input line 152. For example, the aqueous solution is a sodium chloride solution that contains chloride anions and sodium cations or a potassium chloride solution that contains chloride anions and potassium cations. The ions within the aqueous solution transfer the electric current between the first electrode 22 and the second electrode 24 to complete the electrolytic circuit. The liquid chamber 26 does not require a selectively permeable membrane.

The gas chamber 28 is in fluid communication with the second electrode 24. The gas chamber 28 is adapted to receive and transfer a gas that has at least some oxygen, for example pure oxygen gas or a gas mixture that contains at least some oxygen, such as air. The amount of oxygen is not limited, as long as it is enough for the reactions discussed below. In some embodiments, the amount of oxygen is at least twice of the stoichiometric volume needed for the reaction.

The first electrode 22 includes an electrode substrate composed of titanium or a titanium alloy. The first electrode 22 is generally planar in shape with a first side 21 and a second side 23. The second side 23 is in fluid communication with the liquid chamber 26. When the electrolytic circuit is complete, the first electrode oxidizes the anions, e.g. the chloride ions from the sodium chloride solution, to produce oxidation products, chloride gas, and electrons:

$$2Cl^- \rightarrow Cl_2 + 2e^- \tag{1}$$

The second electrode 24 is generally planar, with a first surface 25 and a second surface 27. The first surface 25 is in fluid communication with the liquid chamber 26 and the second surface 27 is in fluid communication with the gas chamber 28. The second electrode 24 has a current collector (not shown) composed of a titanium mesh. The current collector conducts the electric current from the power source 100 to the reactive part of the second electrode 24. The reactive part of the second electrode 24 is a high surface area, activated carbon substrate located between the first surface 25 and the second surface 27.

The first surface 25 is water permeable to allow water from the liquid chamber 26 to permeate the activated carbon substrate. The second surface 27 is permeable to gas which allows gas to permeate the activated carbon substrate from the gas chamber 28. Inside the activated carbon substrate of the second electrode 24, the oxygen gas reacts with the liquid water:

$$2H_2O + O_2 + 4e^- \rightarrow 4OH^- \tag{2}$$

The hydroxide ions produced by the reaction move from the solid phase of the second electrode 24 to the liquid chamber 26 through a coating 30 of a polymer comprising structural units of formula

I wherein $R^1$ is independently at each occurrence a $C_1$-$C_6$ alkyl radical or —$SO_3H$; $R^2$ is independently at each occurrence a $C_1$-$C_6$ alkyl radical; a is independently at each occurrence an integer ranging from 0 to 4; and b is independently at each occurrence an integer ranging from 0 to 3.

In some embodiments, b=0, a=0 and the polymer comprising structural units of formula I is poly[2,20-(p-oxydiphenylene)-5,50-bibenzimidazole] (OPBI) prepared, in some embodiments, by the condensation of diamine and benzoic acid derivatives in the presence of a catalyst and a solvent with heating. Examples of the catalyst include, but are not limited to, $P_2O_5$, polyphosphoric acids, and concentrated sulfuric acid. Examples of the solvent include, but are not limited to, methanesulfonic acid, trifluoromethanesulfonic acid, 4-(trifluoromethyl)benzenesulfonic acid, dimethyl sulfur oxide, dimethylamide acetate, dimethyl formamide. The heating temperature may be in a range of from about 50° C. to about 300° C., preferred of from about 120° C. to about 180° C.

In some embodiments, b=0, a=1, $R^1$ is —$SO_3H$, and the polymer comprising structural units of formula I is sulfonated poly[2,20-(p-oxydiphenylene)-5,50-bibenzimidazole] (SOPBI) prepared by the post-sulfonation reaction of the OPBI polymer, using concentrated and fuming sulfuric acid as the sulfonating reagent at a temperature in a range of from about 25° C. to about 200° C., and preferred in a range of from about 50° C. to about 100° C. The degree of sulfonation is not limited and may be as high as 100% by adjusting the reaction conditions.

According to embodiments of the present invention, the polymer comprising structural units of formula I is coated on the first surface 25. The coating 30 may be formed through the following steps: mixing a solution of the polymer comprising structural units of formula I, e.g., in any one or more of dimethyl sulphoxide (DMSO), N-methylpyrrolidone (NMP), dimethylformamide (DMF), and dimethylacetamide (DMAc), with a solution of sodium hydroxide, e.g., in one or more of ethanol, methanol, and isopropyl alcohol, to prepare a coating solution; applying the coating solution to the first surface 25; putting the second electrode 24 in the vacuum; and drying the second electrode 24. The coating solution may be filtered through a polytetrafluoroethylene (PTFE) filter and degassed under a reduced pressure before being applied to the first surface 25. In some embodiments, the second electrode 24 may be washed using water after drying to remove the residual solvent, if any.

In some embodiments, the second electrode 24 may be immersed in a solution of the SOPBI polymer and a suitable crosslinking agent such as Eaton's reagent (phosphorus pentoxide solution in methanesulfonic acid in the weight ratio of 1:10) at about 50~150° C. for 10~60 minutes to be coated with crosslinked SOPBI polymer with a better mechanical strength and a smaller swelling ratio.

The coating 30 transports hydroxide ions out of the activated carbon substrate of the second electrode 24 and into the liquid chamber 26. Within the liquid chamber 26, when a sodium chloride electrolyte aqueous solution is used, a reaction happens as:

$$Cl_2 + 2NaOH \rightarrow NaClO + NaCl + H_2O \quad (3).$$

This reaction produces sodium hypochlorite and a sodium chloride solution.

In some embodiments, the second side 23 is very close to the surface of the coating 30 making the dimensions of the liquid chamber 26 very small. This small liquid chamber 26 is large enough to permit the flow of fluids into, and the reaction products out of, the electrolytic cell 20. This optional feature may improve the efficiency of the reaction (3) from above.

In some embodiments, the gas within the gas chamber 28 may be air and contain trace gases such as carbon dioxide, helium, hydrogen and the like. In some embodiments, the presence of carbon dioxide within the gas chamber 28 may require a water softening treatment (not shown) of the aqueous solution prior to introduction into the liquid chamber 26. The water softening reduces or removes water hardness ions such as calcium, magnesium, potassium, strontium, and barium. The water softening treatment prevents the reaction of the carbon dioxide with the water hardness ions which can lead to the formation of undesirable carbonate ions and salts within the second electrode 24.

Carbonate ions and salts may decrease the rate of gas diffusion, which impairs the efficiency of the second electrode 24. Further, carbonate ions may impair or compete with the transport of hydroxide ions by the coating 30.

In some embodiments, a metal oxide catalyst coating (not shown) is coated on at least the second side 23 of the first electrode 22 that communicates with the liquid chamber 26. The metal oxide catalyst coating may be ruthenium oxide, iridium oxide and the like. The metal oxide catalyst coating increases the efficiency of the oxidation of the chloride ions to produce chlorine gas and electrons, see equation (1) above.

In some embodiments, the activated carbon substrate of the second electrode 24 contains catalytic particles. Suitable catalytic particles are selected from platinum, ruthenium, iridium, rhodium and manganese dioxide and the like. The catalytic particles increase the efficiency of the hydroxide ion producing reaction (2) from above.

In some embodiments, the current collector of the second electrode 24 is made of nickel mesh or a mesh composed of a conductive titanium and nickel alloy. Optionally, a coating of PTFE may be positioned on the second surface 27 of the second electrode 24 to provide a hydrophobic barrier to the gas chamber 28.

In some embodiments, at least two electrolytic cells 20 may be placed in series so that the aqueous solution flows from one electrolytic cell 20 to the next. This series arrangement can increase the production of hypochlorite.

In some embodiments, the electrolytic cell 20 may include a spacer (not shown) between the first and the second electrodes 22, 24 and a pair of end plates (not shown) to enclose the electrodes 22, 24 and the spacer therebetween.

In operation, an electrolyte fluid, for example sodium chloride solution, is introduced through the input line 152 into the liquid chamber 26 between the first electrode 22 and the second electrode 24. The presence of sodium ions and chloride ions allows the electric circuit to be completed between the first electrode 22 and the second electrode 24. The complete electric circuit provides a flow of electrons to drive the oxidation reaction to produce oxidation products at the first electrode 22. For example, see equation (1). The flow of electrons also drives the reduction reaction to produce reduction products at the second electrode 24, for example, see equation (2). When the aqueous solution is sodium chloride solution, chlorine ions are oxidized into chlorine gas at the first electrode 22. Whereas, at the second electrode 24, oxygen from the gas chamber 28 is reduced to form hydroxide ions. The coating 30 of the second electrode 24 transports the hydroxide ions out of the second electrode 24 to react with the chlorine gas to produce sodium hypochlorite within the liquid chamber 26.

The output line 154 conducts the electrochemical products (for example sodium hypochlorite and sodium chloride) away from the liquid chamber 26 to the downstream unit 156. The water treatment system 150 may be physically located close enough to the target water circulation system that the output line 154 can conduct hypochlorite directly into the target water circulation system, shown as the downstream unit 156 in FIG. 1 so that hypochlorite may control the level of microorganisms in the target water circulation system.

Alternatively, the downstream unit 156 may include a storage vessel (not shown) where the electrochemical products are stored for introduction into the target water circulation system as needed, for example, if the electrolytic cell 20 production exceeds the demands of the target water circulation system.

Optionally, the water treatment system 150 is located at a different physical location than the target water circulation system. In this option, the downstream unit 156 is a storage vessel to store hypochlorite products for transport to the target water circulation system.

In some embodiments, a recirculation line 158 (shown as the dotted lines in FIG. 1) is included the water treatment system 150 to recirculate at least a portion of the electrochemical products back into the input line 152 or directly into the electrolytic cell 20. In this optional feature the recirculation line 158 may include a pumping system (not shown) and possibly a secondary storage vessel (not shown).

As can be seen from the following examples, the electrolytic cell and the method according to embodiments of the present invention significantly increase the productivity of sodium hypochlorite. In addition, without being bound by theory, since the coating 30 is a part of the second electrode 24, the resistance of the electrolytic cell 20 is lower than a similar electrolytic cell that includes a membrane instead of a coating and as an individual component separate from electrodes. In this manner, the working potential requirements and the energy consumption of the electrolytic cell 20 are also lower than the similar electrolytic cell. Therefore, an improved water treatment system and an associated method are provided.

EXAMPLES

The following example is included to provide additional guidance to those of ordinary skill in the art in practicing the claimed invention. This example does not limit the invention as defined in the appended claims.

Example 1

Monomer A (4,4'-dicarboxydiphenyl ether) and B (3,3',4,4'-biphenyltetramine) were added at a molar ratio of 1:1 into a three neck flask equipped with a refluxing condenser, a mechanical stirring bar and a nitrogen purging set. A mixture of $CF_3SO_3H$ and $P_2O_5$ at a weight ratio of 10:1 was added into the flask to make a solution in which $(A+B)/CF_3SO_3H \times 100\%$ was 10 wt %. The solution was then heated to 140° C. under $N_2$ atmosphere for 120-180 minutes. A product (OPBI polymer) was obtained by pouring the reaction product into water, and washing in a $Na_2CO_3$ aquatic solution till the pH was neutral. The H NMR data of the OPBI polymer in DMSO were: 7.2-7.4 (brs, 2H), 7.4-8 (br, 3H), 8.2-8.4 (brs, 2H), 13 (brs, 1H).

Example 2

The OPBI polymer obtained in example 1 was submerged into 30% fuming sulfuric acid at 80° C. for 120-180 minutes under mechanical stirring to get the sulfonated OPBI (SOPBI) polymer. The H NMR data of the SOPBI polymer in DMSO were: 7-7.2 (brs), 7.2-8 (br), 8.2-8.4 (brs), 8.7-8.8 (brs), 13 (brs).

Example 3

Dimethylaminopropyl methacrylamide (17 g) was dissolved in 100 g deionized water in a flask under magnetic stirring at 550-600 rpm, 9.86 g 37% HCl was added into the solution slowly to keep the temperature below 50° C. After that, 10.1 g 1,4-Butanediol diglycidyl ether was added into the solution at 50-60° C. The mixture was then heated to 70-80° C. for 2 hours and cooled to the room temperature. VA-044 (2,2'-Azobis[2-(2-imidazolin-2-yl)propane]dihydrochloride, 1.6 g) in 100 g deionized water was added into the solution below 40° C. and mixed for 15 minutes to obtain an anion exchange polymer. The H NMR data of the anion exchange polymer in $D_2O$ were: 1.3-1.4 (br, 3H), 1.5-1.6 (br, 4H), 2-2.1 (br, 2H), 3.2-3.7 (br, 16H), 4.2 (br, 1H).

1,4-bis(oxiran-2-ylmethoxy)butane

-continued

Example 4

A solution comprising 0.45 g NaOH in 5 mL ethanol was added into a mixture of 2.5 g of the OPBI polymer and 30 mL DMSO, stirred with a magnetic stirring bar at 60° C. until the OPBI polymer was fully dissolved. The resulting solution was filtered through a 0.5 μm PTFE film and the filtrate was degassed under a reduced pressure.

The filtrate was brushed to be coated on an air cathode having no separator layer. The air cathode used in this example and example 5 included a manganese based catalyzed carbon active layer, and a blocking layer (laminated porous Teflon® film). The width of the air cathode was 8.9 cm and the thickness of the air cathode was 0.5 mm. The coated air cathode was put into a vacuum oven, covered with a watch glass, and dried at 100° C. for 8 hours.

After drying, the coated air cathode was immersed in the deionized water at the room temperature three times for a total period of time of 2 hours to remove any residual solvent.

Example 5

Four electrolytic cells were built up, each comprising a ruthenium combined with metal oxidation titanium anode obtained from Suzhou Borui Industrial Material Science & Technology CO., LTD and a cathode: an air cathode having a polypropylene film as a separator layer, an air cathode having no separator layer, an air cathode having no separator layer and coated with OPBI in example 4, or an air cathode having no separator layer and coated in a similar way as that in example 4 with an anion exchange polymer prepared in example 3.

Each of the electrolytic cells included one spacer between the anode and the cathode to supply a liquid chamber and another spacer at the other side of the cathode to provide a gas chamber. Two organic glass plates enclosed the electrodes and the spacers therebetween.

Each of the electrolytic cells was charged with a DC constant current through an AC/DC converter. The current was set at 16 A and 23 A, the current density was 120 mA/cm$^2$ and 172 mA/cm$^2$ accordingly. Sodium chloride solution of 100 g/l was fed into the electrolytic cell at different flow rates. Air was fed into the electrolytic cell at 12.5 l/minute. Two pressure meters were used to monitor the pressure in the gas chamber and the liquid chamber of the electrolytic cell, respectively. The output of the liquid chamber was collected to test the free chlorine level with the N,N-diethyl-p-phenylenediamine (DPD) method through DR5000™ spectrophotometer of Hach company. Test results were measured at 530 nm. The output of the gas chamber was connected to a valve to control the pressure of the gas chamber to be equal or a little bit higher than the liquid chamber.

The flow rates of the sodium chloride solution, flow velocities of the sodium chloride solution, levels of free chlorine, the productivity of sodium hypochlorite and corresponding cathode types when the current density were 120 mA/cm$^2$ and 172 mA/cm$^2$ are shown in tables 1 and 2 below.

As can be seen from tables 1 and 2 below, in the electrolytic cell with a cathode coated with the OPBI polymer, the free chlorine level was about 50% increased with respect to those of other electrolytic cells.

TABLE 1 current density: 120 mA/cm$^2$

| Cathode type | flow rate ml/min | flow velocity cm/s | free chlorine | productivity g/day |
|---|---|---|---|---|
| With the separator layer | 60 | 0.67 | 4912 | 424 |
|  | 60 | 0.67 | 4825 | 417 |
|  | 60 | 0.67 | 4825 | 417 |
|  | 80 | 0.89 | 3421 | 394 |
|  | 80 | 0.89 | 3509 | 404 |
|  | 80 | 0.89 | 3421 | 394 |
|  | 120 | 1.33 | 2281 | 394 |
|  | 120 | 1.33 | 2368 | 409 |
|  | 120 | 1.33 | 2281 | 394 |
|  | 160 | 1.78 | 1974 | 455 |
|  | 160 | 1.78 | 1974 | 455 |
|  | 160 | 1.78 | 2018 | 465 |
| No separator layer, coated with the anion exchange polymer | 60 | 0.67 | 4298 | 371 |
|  | 60 | 0.67 | 4211 | 364 |
|  | 60 | 0.67 | 4298 | 371 |
|  | 80 | 0.89 | 2807 | 323 |
|  | 80 | 0.89 | 2719 | 313 |
|  | 80 | 0.89 | 2807 | 323 |
|  | 120 | 1.33 | 2281 | 394 |
|  | 120 | 1.33 | 2325 | 402 |
|  | 120 | 1.33 | 2281 | 394 |
|  | 160 | 1.78 | 1711 | 394 |
|  | 160 | 1.78 | 1754 | 404 |
|  | 160 | 1.78 | 1711 | 394 |
| No separator layer, no coating | 80 | 0.89 | 3114 | 359 |
|  | 80 | 0.89 | 3443 | 397 |
|  | 100 | 1.11 | 2675 | 385 |
|  | 100 | 1.11 | 2697 | 388 |
|  | 110 | 1.22 | 2442 | 387 |
|  | 120 | 1.33 | 2412 | 417 |
|  | 120 | 1.33 | 2208 | 381 |
|  | 140 | 1.56 | 1996 | 402 |
|  | 160 | 1.78 | 1718 | 396 |
| No separator layer, coated with the OPBI polymer | 40 | 0.44 | 9800 | 564 |
|  | 40 | 0.44 | 10200 | 588 |
|  | 60 | 0.67 | 8200 | 708 |
|  | 60 | 0.67 | 8600 | 743 |
|  | 80 | 0.89 | 5600 | 645 |
|  | 80 | 0.89 | 5700 | 657 |

TABLE 2

| | Current density: 172 mA/cm² | | | |
|---|---|---|---|---|
| Cathode type | flow rate ml/min | flow velocity cm/s | free chlorine | productivity g/day |
| With the separator layer | 40 | 0.44 | 7368 | 424 |
| | 40 | 0.44 | 7544 | 435 |
| | 40 | 0.44 | 7368 | 424 |
| | 60 | 0.67 | 6140 | 531 |
| | 60 | 0.67 | 6053 | 523 |
| | 60 | 0.67 | 6140 | 531 |
| | 80 | 0.89 | 4561 | 525 |
| | 80 | 0.89 | 4649 | 536 |
| | 80 | 0.89 | 4737 | 546 |
| No separator layer, coated with the anion exchange polymer | 60 | 0.67 | 5877 | 508 |
| | 60 | 0.67 | 6053 | 523 |
| | 80 | 0.89 | 4386 | 505 |
| | 80 | 0.89 | 4298 | 495 |
| | 80 | 0.89 | 4386 | 505 |
| No separator layer, no coating | 80 | 0.89 | 4539 | 523 |
| | 100 | 1.11 | 3699 | 533 |
| | 100 | 1.11 | 3289 | 474 |
| | 120 | 1.33 | 2836 | 490 |
| | 140 | 1.56 | 2726 | 550 |
| | 140 | 1.56 | 2500 | 504 |
| | 160 | 1.78 | 2281 | 525 |
| No separator layer, coated with the OPBI polymer | 40 | 0.44 | 12200 | 703 |
| | 40 | 0.44 | 12400 | 714 |
| | 60 | 0.67 | 11200 | 968 |
| | 60 | 0.67 | 11400 | 985 |
| | 80 | 0.89 | 9400 | 1083 |
| | 80 | 0.89 | 9200 | 1060 |

While the disclosure has been illustrated and described in typical embodiments, it is not intended to be limited to the details shown, since various modifications and substitutions may be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. A water treatment system comprising:
an electrolytic cell comprising:
a first electrode;
a second electrode comprising an activated carbon substrate and a coating of polymer comprising structural units of formula I and
a power source for powering the first and the second electrodes;
wherein
$R^1$ is independently at each occurrence a $C_1$-$C_6$ alkyl radical or —$SO_3H$;
$R^2$ is independently at each occurrence a $C_1$-$C_6$ alkyl radical;
a is independently at each occurrence an integer ranging from 0 to 4; and
b is independently at each occurrence an integer ranging from 0 to 3.

2. The water treatment system of claim 1, wherein b=0.
3. The water treatment system of claim 2, wherein a=0.
4. The water treatment system of claim 2, wherein a=1, $R^1$ is —$SO_3H$.
5. The water treatment system of claim 1, wherein the first electrode is opposite to the coating of the polymer on the second electrode.
6. The water treatment system of claim 1, wherein the electrolytic cell comprises a liquid chamber between the first electrode and the coating of the polymer on the second electrode.
7. The water treatment system of claim 6, comprising an input line in communication with the liquid chamber.
8. The water treatment system of claim 6, comprising an output line in communication with the liquid chamber.
9. The water treatment system of claim 1, wherein the electrolytic cell comprises a gas chamber on an opposite side of the coating of the polymer and away from the first electrode.
10. A method, comprising:
passing an electric current through an aqueous solution of an electrolyte;
oxidizing at least a portion of anions of the aqueous solution to produce oxidation products;
reducing at least some oxygen gas to produce hydroxide ions;
transporting the hydroxide ions into proximity with the oxidation products through an activated carbon substrate and a coating of a polymer comprising structural units of formula to react with the oxidation products and cations of the aqueous solution to produce hypochlorite; and
providing said hypochlorite to water to control levels of microorganisms;
wherein
$R^1$ is independently at each occurrence a $C_1$-$C_6$ alkyl radical or —$SO_3H$;
$R^2$ is independently at each occurrence a $C_1$-$C_6$ alkyl radical;
a is independently at each occurrence an integer ranging from 0 to 4; and
b is independently at each occurrence an integer ranging from 0 to 3.
11. The method of claim 10, wherein the aqueous solution is an alkali halide solution.
12. The method of claim 10, wherein the oxidation products are diatomic halide gas.
13. The method of claim 10, wherein the passing step comprises passing the electric current through a first electrode and a second electrode of an electrolytic cell.
14. The method of claim 10, wherein the aqueous solution is a sodium chloride solution or a potassium chloride solution.
15. The method of claim 10, wherein b=0.
16. The method of claim 15, wherein a=0.
17. The method of claim 15, wherein a=1, $R^1$ is —$SO_3H$.

18. The method of claim 10, wherein the polymer comprising structural units of formula I comprises structural units of formula 19. The method of claim 10, wherein the polymer comprising structural units of formula I comprises structural units of formula 20. The method of claim 10, wherein the coating of the polymer is on an electrode of an electrolytic cell.

* * * * *